US009088576B2

(12) United States Patent
Kenna, III et al.

(10) Patent No.: US 9,088,576 B2
(45) Date of Patent: *Jul. 21, 2015

(54) ELECTRONIC MEDIA CREATION AND DISTRIBUTION

(71) Applicant: The Marlin Company, Wallingford, CT (US)

(72) Inventors: Frank Kenna, III, Branford, CT (US); Preeti M. Patel, Norwalk, CT (US)

(73) Assignee: THE MARLIN COMPANY, Wallingford, CT (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/284,748

(22) Filed: May 22, 2014

(65) Prior Publication Data

US 2014/0289811 A1    Sep. 25, 2014

Related U.S. Application Data

(63) Continuation-in-part of application No. 12/723,744, filed on Mar. 15, 2010, which is a continuation of application No. 11/541,160, filed on Sep. 29, 2006, now Pat. No. 7,743,112, which is a continuation-in-part of application No. 11/050,093, filed on Feb. 3, 2005, now Pat. No. 7,765,273, which is a continuation of application No. 09/758,833, filed on Jan. 11, 2001, now abandoned.

(51) Int. Cl.
*G06F 3/048* (2013.01)
*G06F 15/16* (2006.01)
*H04L 29/08* (2006.01)
*G06Q 10/10* (2012.01)
(Continued)

(52) U.S. Cl.
CPC .............. *H04L 67/10* (2013.01); *G06Q 10/10* (2013.01); *G06Q 30/02* (2013.01); *G06Q 30/0272* (2013.01); *H04L 63/0428* (2013.01);
*H04L 63/102* (2013.01); *H04W 12/02* (2013.01); *H04L 2463/101* (2013.01)

(58) Field of Classification Search
CPC .... G06Q 10/10; G06Q 10/101; H04L 65/4084
See application file for complete search history.

(56) References Cited

U.S. PATENT DOCUMENTS 5,872,589 A    2/1999 Morales
5,889,896 A    3/1999 Meshinsky et al.
(Continued)

OTHER PUBLICATIONS

Yang et al., "InterRing: An Interactive Tool for Visually Navigating and Manupulating Hierarchical Structures", 2002, IEEE Symposium on Information Visualization, pp. 1-8.

*Primary Examiner* — Matthew Gart
*Assistant Examiner* — Talia Crawley
(74) *Attorney, Agent, or Firm* — Cantor Colburn LLP

(57) ABSTRACT

An aspect of electronic media creation and distribution includes receiving an electronic media collection including pre-assembled media content generated by a service provider computer, modified pre-assembled media content generated by a subscriber entity, and custom generated media content from end user computers associated with the subscriber entity. A further aspect includes receiving a media content item, as the custom generated media content, from one of the end user computers, receiving a request from the end user computer to publish the media content item, determining a content channel selected by the subscriber entity, and determining a frame associated with the content channel. A further aspect includes integrating the media content item with the pre-assembled media content and the modified pre-assembled media content, and distributing the electronic media collection to at least one other end user computer for presentation on a display device.

18 Claims, 10 Drawing Sheets

(51) Int. Cl.
*G06Q 30/02* (2012.01)
*H04L 29/06* (2006.01)
*H04W 12/02* (2009.01)

(56) References Cited

U.S. PATENT DOCUMENTS

| | | | |
|---|---|---|---|
| 5,946,414 A | 8/1999 | Cass et al. | |
| 7,050,654 B2 | 5/2006 | Lunetta et al. | |
| 7,062,454 B1 | 6/2006 | Giannini et al. | |
| 7,231,371 B1 * | 6/2007 | Cantini et al. | 705/65 |
| 7,578,443 B1 | 8/2009 | Harris | |
| 7,734,475 B2 | 6/2010 | Allan et al. | |
| 7,743,112 B2 * | 6/2010 | Kenna et al. | 709/217 |
| 7,765,273 B2 | 7/2010 | Kenna, III et al. | |
| 8,060,904 B1 * | 11/2011 | Evans et al. | 725/35 |
| 8,073,711 B1 | 12/2011 | McCollum et al. | |
| 8,365,094 B2 | 1/2013 | Sato et al. | |
| 8,739,204 B1 * | 5/2014 | Evans et al. | 725/32 |
| 2004/0230917 A1 | 11/2004 | Bales et al. | |
| 2005/0060647 A1 | 3/2005 | Doan et al. | |
| 2006/0107218 A1 | 5/2006 | Clark et al. | |
| 2006/0286536 A1 | 12/2006 | Mohler et al. | |
| 2007/0198930 A1 | 8/2007 | Chu et al. | |
| 2007/0245257 A1 | 10/2007 | Chan et al. | |
| 2007/0266321 A1 | 11/2007 | Bicker et al. | |
| 2008/0052623 A1 | 2/2008 | Gutfleisch | |
| 2008/0077530 A1 | 3/2008 | Banas et al. | |
| 2009/0100339 A1 | 4/2009 | Wharton-Ali et al. | |
| 2010/0175010 A1 | 7/2010 | Jeyabalan et al. | |
| 2010/0175017 A1 | 7/2010 | Kenna, III et al. | |
| 2010/0306195 A1 | 12/2010 | Wagener et al. | |
| 2011/0055767 A1 | 3/2011 | Chen et al. | |
| 2011/0154234 A1 | 6/2011 | Winternitz et al. | |
| 2011/0219433 A1 | 9/2011 | Albrecht-Buehler | |
| 2012/0240194 A1 | 9/2012 | Nack Ngue | |

* cited by examiner

ELECTRONIC MEDIA CREATION AND DISTRIBUTION

CROSS-REFERENCE TO RELATED APPLICATIONS

This application is a continuation-in-part of U.S. patent application Ser. No. 12/723,744, filed on Mar. 15, 2010, which is a continuation of U.S. patent application Ser. No. 11/541,160 filed on Sep. 29, 2006 (now U.S. Pat. No. 7,743,112), which is a continuation-in-part of U.S. patent application Ser. No. 11/050,093 filed on Feb. 3, 2005 (now U.S. Pat. No. 7,765,273), which is a continuation of U.S. patent application Ser. No. 09/758,833 filed on Jan. 11, 2001.

BACKGROUND

The present invention relates generally to electronic media communications, and, more particularly, to the creation and distribution of targeted electronic media communications.

Modern business management calls for effective communications between management and employees. Among various other techniques for communicating with employees, conventional employee communication programs have typically included providing a bulletin board upon which printed material, such as for example, posters including photographs, artwork, designs and/or slogans, and messages are displayed. Topics that may be the subject of employee communications are diverse and may involve safety, work quality, teamwork, morale and self-motivation. For example, since safety is an important consideration in most working environments, a poster with a slogan relating to the exercise of caution in potentially dangerous situations may be displayed for impressing upon employees an employer's requirement for observing on-the-job safety. Other examples of representative employee communications include news releases about the company, messages for boosting employee morale and/or messages relating to employee activities.

In conventional systems, graphic designers may develop posters and other employee communications by hand or on a computer aided design system. Typically, they are printed as a large employee communication for display and then sent to a client for mounting to a bulletin board. The bulletin board may be relatively sophisticated and creatively organized for efficiency and visual attention, such as a three-panel bulletin board on the order of 26 inches (66 centimeters) by 63 inches (160 centimeters). The posters are typically manually replaced to communicate corporate goals, news of interest and employee activities to employees.

At regular time intervals, such as once a month or once a week, clients may select new posters and messages and/or the new posters and messages are automatically selected, printed and shipped periodically to each client. Because of the large number and variety of clients and the specific requirements for certain users, there are significant inefficiencies associated with selecting, printing and shipping the employee communications. This is especially so where various bulletin boards located throughout a company's various facilities require different material to be posted on differing bulletin boards.

In addition, achieving a relatively high degree of customization and selectivity with traditional manual bulletin board systems is economically problematic.

SUMMARY

In an exemplary embodiment, a method for transmitting and displaying electronic media is provided. The method includes receiving an electronic media collection including pre-assembled media content generated by a service provider computer, modified pre-assembled media content generated by a subscriber entity, and custom generated media content from end user computers associated with the subscriber entity. The method also includes receiving a media content item, as the custom generated media content, from one of the end user computers, receiving a request from the end user computer to publish the media content item over a network, determining a content channel selected by the subscriber entity associated with the end user computer, and determining a frame associated with the content channel. The frame is one of multiple frames that are configured to display the pre-assembled media content and the modified pre-assembled media content. The method also includes integrating the media content item with the pre-assembled media content and the modified pre-assembled media content, and distributing the media content item, the pre-assembled media content, and the modified pre-assembled media content to at least one other end user computer of the end user computers for presentation on a display device. The media content item is displayed with the frame based on the content channel.

A system and computer program product for implementing electronic media communications are also provided.

BRIEF DESCRIPTION OF THE DRAWINGS

Referring now to the drawings, wherein like reference numerals designate corresponding structure throughout the views.

DETAILED DESCRIPTION

As used in this application, the term "deliver" shall be understood to encompass transmitting, downloading and uploading, or any combination thereof.

The term "network" as used herein includes both networks and internetworks of all kinds, including the Internet, and is not limited to any particular network or inter-network.

The terms "media data" and "media content" as used herein means data distributed on storage media, or otherwise, without regard to the form or content thereof, and including but not limited to audio, video, text, images, animations, web pages and streaming media data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

Figure 1:
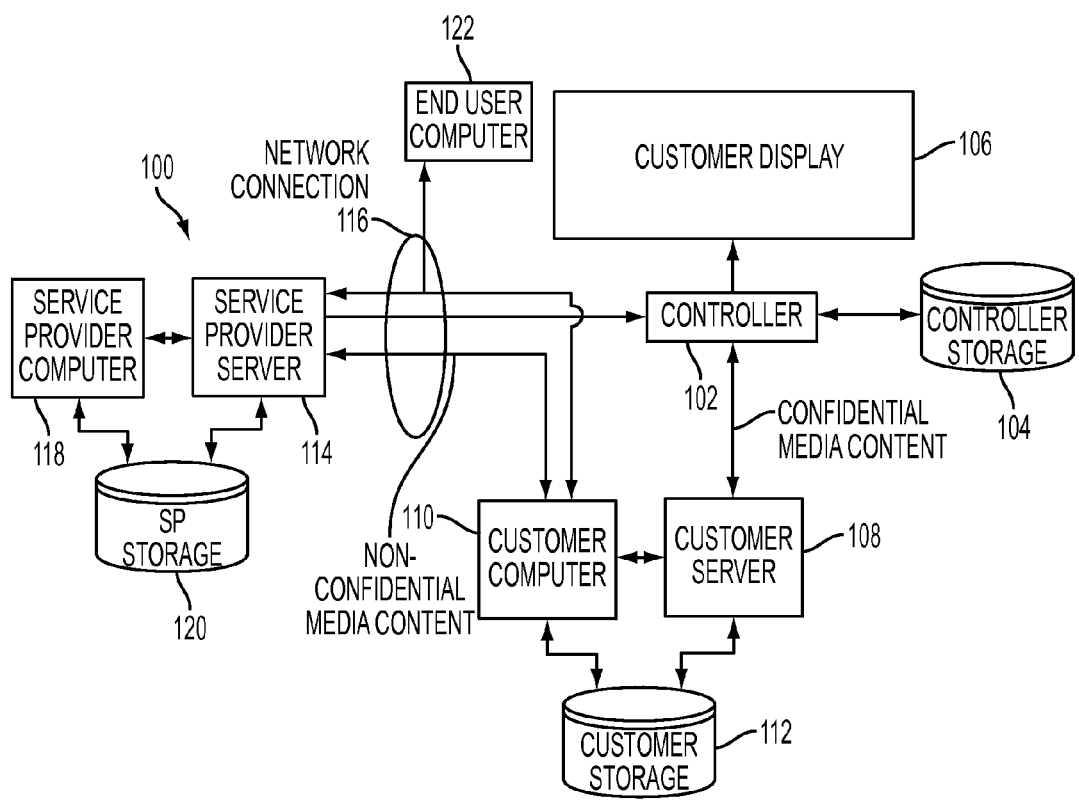
FIG. 1 is a block diagram of a system according to some embodiments of the present invention.

FIG. 1 is a block diagram of an electronic media system 100 according to an embodiment. Electronic media system 100 is illustrated including a controller 102 communicatively coupled to a controller storage 104. The controller 102 is also coupled to a customer display 106. Also illustrated in FIG. 1 are a customer server 108 and customer computer 110. The customer computer 110 is coupled to a customer storage 112. The term "customer" as used herein is also referred to throughout as "subscriber." A service provider server 114 is shown variously coupled to controller 102 and to customer computer 110 via a network connection 116. A service provider computer 118 is further illustrated coupled to service provider storage 120 and service provider server 114. An end user computer 122 is also shown variously coupled to the service provider server 114 and the customer computer 110 via the network connection 116. The term "end user" as used herein refers to a member or employee of the subscriber.

Controller 102 may be any type of electronic programmable controller capable of receiving electronic data and transmitting the received data to a video display. In addition, the customer display 104 may be virtually any type of video display; however, in one embodiment, customer display 104 may be 26 inches (66 centimeters) in height and 63 inches (160 centimeters) in width and may be a flat panel video display.

The end user computer 122 may be any type of computer, such as a general-purpose desktop computer or PC. Alternatively, the end user computer 122 may be a portable computing device, such as a lap top, smart phone, personal digital assistant, or tablet PC.

It will be understood by those skilled in the art that, while only a single instance of the end user computer 122 is shown in FIG. 1, any number of end user computers 122 may be utilized to realize the exemplary embodiments described herein. For example, a given customer may employ and distribute multiple end user computers for use by employees, and these end user computers may be deployed across multiple geographic locations associated with a customer enterprise.

The controller 102 is coupled to service provider server 114 via network connection 116. It is contemplated that network connection 114 may include, for example, any one or more of the following: the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections. In addition, the network connection 116 may be implemented using one or more cellular, satellite, and terrestrial communication technologies. Further, short-range communications protocols may also be enabled by the network connection 116, such as Bluetooth™, Bluetooth LTE, WiFi, and Zigbee, to name a few.

A subscriber may access a variety of media content provided by the service provider to the subscriber. For example, the subscriber is provided with pre-assembled media content generated and provided by the service provider. This pre-assembled media content includes media information the service provider has assembled and is believed would be of interest to the subscriber, e.g., based on the subscriber's type of business or from direct input received from the subscriber. The service provider may further suggest certain media content to the subscriber, which the subscriber may or may not select for display to its employees via, e.g., the customer display 106. In addition, the service provider may continually update the pre-assembled media content to provide fresh information to the subscriber so as to keep employees interested in the displayed information.

Also provided for the subscriber is the ability to modify the pre-assembled media content. For example, the subscriber may wish to present some of the pre-assembled media content to its employees with some minor changes that are particular, for instance, to the site location of the employees. The subscriber may select the pre-assembled media content and, by means of editing tools in the system software (e.g., FIG. 6), may modify the pre-assembled media content as desired. This may include adding new content to the pre-assembled media content, deleting certain media content, rearranging the media content including altering the size, look and feel of the media content, altering the play time or play order for certain media content and so forth.

Still further, the subscriber may wish to generate entirely new media content completely unrelated to any of the pre-assembled media content. Again, the subscriber is provided with the tools to be able to compile virtually any information or data desired to be displayed on customer display 106.

Additionally, the subscriber may permit end users (e.g., employees) of end user computers 122 to submit content as well. This feature is described further in FIGS. 6-10.

Once the subscriber has viewed, modified and/or generated the media content to be displayed, the subscriber may compile an electronic media collection, which comprises all the information that the subscriber desires to be played on the customer display 106. The subscriber may further assemble the media content to play in a desired play order including selecting the length of time each segment of information will be displayed on the customer display 106.

The electronic media collection may, in one embodiment, be stored on service provider storage 120. In this manner, a subscriber may access and select certain pre-assembled media content and save an electronic media collection of the media content on service provider storage 120. In addition, the subscriber may access and modify certain pre-assembled media content and save the modified media content in the electronic media collection. Still further, the subscriber may generate completely new media content, which may also be saved in the electronic media collection on service provider storage 120. However, it is contemplated that the newly generated media content may comprise sensitive confidential information that the subscriber wants to protect as confidential. In this manner, the subscriber may generate the confidential media content on, for example, customer computer 110 and store the confidential media content on customer storage 112 on a secure network. When assembling the electronic media collection, rather than placing the confidential media content on service provider server 114, the customer may simply provide an electronic address, such as a URL, pointing to the location of the confidential media content. In this manner, the electronic media collection is downloaded to controller 102 from service provider server 114 and saved on controller storage 104. When the electronic media collection is run by controller 102, any point in the program where confidential media content is to be played, the controller will be directed to obtain that information at an address on the customer system, for example, controller 102 may be coupled to customer server 108 to access the confidential media content saved on customer storage 112. In this way, the subscriber may generate confidential media content that will be maintained securely on the subscriber private network.

However, it is further contemplated that the subscriber may generate non-confidential information that need not be stored on the customer's system. In this manner, the non-confidential media content may simply be uploaded to service provider server 114 and saved on service provider storage 120 as desired.

The electronic media system 100 therefore, provides for complete control of the media content to be played on customer display 106. In addition, the system 100 also allows any highly confidential information to be integrated into the electronic media collection while still maintaining the information secure and confidential on the subscriber's own system.

While the subscriber may, at their choice, modify and/or generate their own media content, the subscriber may simply use the pre-assembled media content. The subscriber can set up the system to automatically update the electronic media collection with new pre-assembled media content as such becomes available. Alternatively, the subscriber may set the system up to provide the subscriber with a notification that new pre-assembled media content for the subscriber's review and authorization to play. Still further, the subscriber may set the system up such that the electronic media collection can only be updated manually. As can be seen, a maximum amount of control is provided to the subscriber for generation, modification and display of media content.

In an embodiment, controller 102 queries service provider server 114 for an electronic media collection to be run on an associated customer display 106. It is contemplated that controller 102 may query service provider server 114 at a period time interval, e.g., every 15 minutes, such that the electronic tool collection is automatically updated. The automatic query function also may provide a diagnostic tool for system 100. For example, if the controller 102 does not query service provider server 114 within a certain time frame, the system 100 may provide an alert to the service provider or the subscriber regarding such. In this manner, the system will not experience significant "down time" as no one is aware the controller 102 is not functioning properly.

As the controller 102 may download the electronic media collection and store it in controller storage 104, which may or may not be a cache memory location, upon severing of the network connection 116, the controller 102 can continue to play the electronic media collection on customer display 106 until the network connection 116 is re-established.

As indicated above, while FIG. 1 has been discussed in connection with only one customer display 106 location, it is contemplated that the subscriber may have many differing display locations, whether in the same complex or in many differing complexes. The subscriber is given maximum control of the media content provided to the various displays as described above. For example, the subscriber may wish to present certain media content to all maintenance personnel in the various complexes, the subscriber may assemble a media collection and assign the collection to a particular group for display. Alternatively, the subscriber may want to provide different information to a customer display 106 for management personnel. The system 100 allows for the full customization of content, while at the same time, allowing the subscriber to associate collections with particular groups to facilitate ease of directing the media content to the correct customer display 106.

In one embodiment, employees of the subscriber may share (e.g., create and distribute) media content with, e.g., one or more display devices (e.g., display 106) or with other employees (e.g., from one end user computer to one or more other end user computers) in a similar manner as that described above with respect to the subscriber. Other functions provided to the subscriber and its employees include customizing personal user interface screens, and permissions-based messaging and interactions. These and other features are described further herein.

Figure 2:
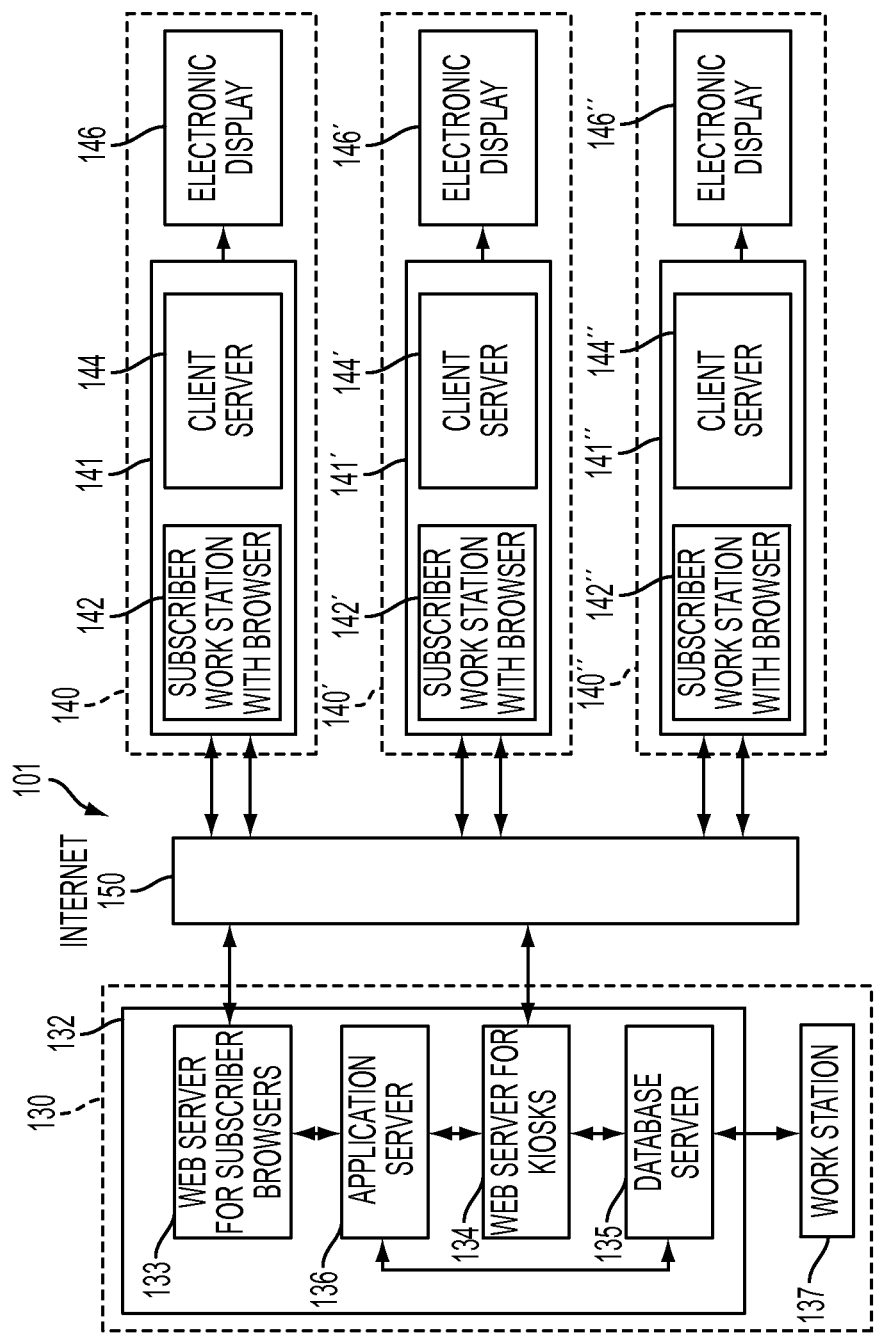
FIG. 2 is block diagram of a system according to some embodiments of the present invention.

An embodiment of a system for distribution of media content (also referred to as electronic media) according to the present invention is schematically illustrated in FIG. 2 and generally designated by the numeral 101. The system 101 for distribution of electronic media facilitates electronic transmission of employee-directed communications from a primary location to one or more remote subscriber locations. The employee-directed communications may take the form of a "poster" as that term is commonly understood, where the poster is created and maintained in electronic form. A typical electronic poster or media collection may include text and graphics arranged to be visually attractive and convey information pertinent to a subscriber's business, workplace or employees. The subject matter of the employee-directed communications may involve safety, quality, teamwork, morale, self motivation, subscriber news releases, employee activities and the like.

The term "employee-directed communication" as used herein is intended to include all forms of visual communication including graphics, written and printed text along with photographs, visual works and artistic material displayed either alone or in any combination. Particular employee communications may take the form of an electronic media collection or poster as described above and further include video and audio presentations. The employee-directed communications may be initiated by the subscriber, as well as an employee. The communications initiated by employees are described further in FIGS. 6-10 herein.

The system 101 for distribution of electronic media includes a main server system 130 located at a primary location and a multiplicity of client or subscriber communication and display systems 140, 140', 140" located at each remote subscriber location. The subscriber communication and display systems 140, 140', 140" communicate with the main server system 130 via, for example, an Internet connection 150, or other suitable communications pathway.

The main server system 130 comprises a computer 132 configured to function as a first web server 133, a second web server 134, a data base server 135, and an application server 136. While the main server system 130 is described in terms of several services and server functions, a single computer 132 may be configured to provide all functions and incorporate all described services. The computer 132 may be any commercially available server such as those manufactured and marketed by the Compaq Corporation or may be or include, for instance, any personal computer running the Microsoft Windows® 95, 98, 2000 or later version, Millenium®, NT®, Windows CE®, Palm® OS, Unix®, Linux®, Solaris®, OS/2®, BeOS®, MacOS® or other operating system or platform. Computer 132 may also be or include any microprocessor-based machine such as an Intel® x86-based device or Motorola 68K or PowerPC device, microcontroller or other general or special purpose device operating under programmed control. In addition, computer 132 may be connected to the Internet connection 150 in a well-known manner. The first web server 133 is configured to be accessible by one or more subscriber work stations 142, 142', 142" to allow subscribers to modify the content of the employee communications.

The second web server 134 may be similar to web server 133 although modified to communicate via with one or more client servers 144, 144', 144". It will be understood that while two web servers 133 and 134 are provided, one web server performing both functions may be employed instead.

The database server 135 may be used to store subscriber information such as subscriber identification, business type, routing information and media data such as employee communication collections developed at a workstation 137 and as modified by the application server 136 as discussed below. Numerous workstations 137 may be employed. Each workstation 137 is configured so that a graphic designer may develop electronic employee communications (which may take the form of electronic media collections) and collect them together into employee communication collections which may contain, for example, collections of media collections and messages for a particular subscriber. The employee communications are created at the workstation 137, using software such as, for example but not limited to, Adobe Photoshop™ or Adobe Illustrator™. The electronic employee communications are then sent to application server 136 where they are organized by edition and subscriber. The work station 137 communicates with the data base server 135 to transmit various electronic employee communications, etc., which are developed at the work station 137 in a conventional manner. The electronic employee communications are converted into an appropriate format for transmission over the Internet connection 150, such as file transfer protocol (FTP), and then stored before transfer to a client communication and display system 140, 140', 140".

The application server 136 communicates with both the first and second web servers 133, 134 and with the data base server 135. The application server 136 provides coordination between the web servers 133 and 134 and allows access to the electronic media collections contained in data base server 135. The application server 136 includes application software that tracks and distributes content according to subscriber data and as modified by subscribers according to the method of the present invention.

The client communication and display system 140, 140', 140" comprises a computer 141, 141', 141" respectively, that may include a client workstation 142, 142', 142", a client server 144, 144', 144", and an electronic display 146, 146', 146". The client workstation 142, 142', 142" communicates with the web server 133 via the Internet connection 150. The client workstation 142, 142', 142" may include a web browser sold under the trademark EXPLORER by the Microsoft Corporation of Redman, Wash. Optionally, other web browsers may be employed. The client work station 142, 142', 142" interactively communicates with web server 133 to transmit subscriber input, for example, to modify an employee communication collection and receive an updated version of the employee communication collection.

The electronic display 146, 146', 146" may be any suitably large electronic display but is preferably a large flat panel gas plasma display, such as those manufactured and sold by the Sony corporation of Japan.

The client server 144, 144', 144" receives employee communication collections (alternatively referred to as electronic media collections) in the form of data in a particular format, for display on the electronic display 146, 146', 146". It will be appreciated that the computer 141, 141', 141" may be located on a housing supporting the electronic display 146, 146', 146", but is preferably separated some distance therefrom. In any event, the client server 144, 144', 144" communicates with the web server 133 via the Internet connection 150. The client server 144, 144', 144" preferably comprises a web browser, which may be configured in a display mode whereby the browser receives data from the web server 133 and generates a continuous display. In particular, it will be understood that a number of channels of the web browser may be used to simultaneously display various elements of the employee communications collection for varying amounts of time.

Figure 5:
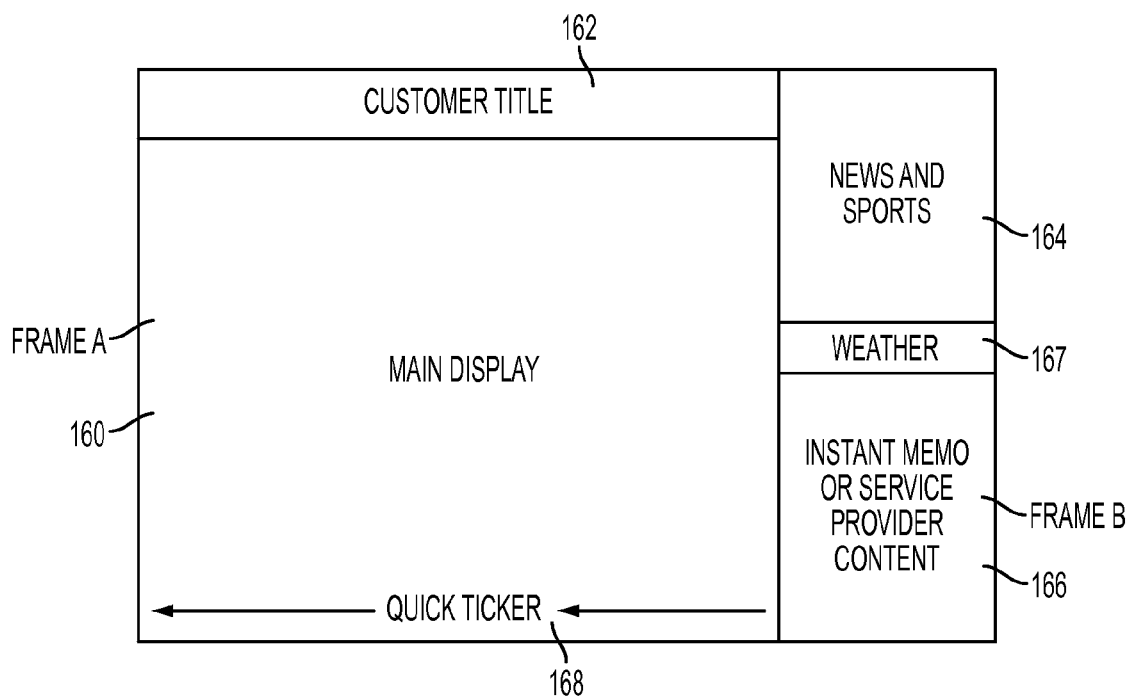
FIG. 5 is an annotated diagram of a representative electronic display according to FIGS. 1 and 2.

The client server 144, 144', 144" communicates employee communication collections (electronic media collections) to the electronic display 146, 146', 146" for display. Preferably, the electronic display 146, 146', 146" may comprise a plurality of sections for displaying different materials (FIG. 5). For example, as seen in FIG. 5, four separate sections 160, 162, 164 and 168 may be provided—each of which may be functioning simultaneously and at different update times and periods. Each section may sequentially display varying messages and/or visual media content, slogans, etc. For example, in section 160 (Frame A) audio/visual electronic media content may be played or shown for a specified time period, e.g. fifteen (15) minutes, and then switch to custom executive media content. Section 166 (Frame B) may display, concurrently with the employee communications displayed on section 160, an employee communication, then switch to Good Will Motivator™ media content and thereafter switch, for example, to a management suggested letter. The relative timing may also be selected. For example, the messages may alternate every fifteen (15) minutes and may start seven and one half (7.5) minutes after the electronic media content is initially displayed in section 160. Section 164 may display news or announcements such as news headlines, sports scores and may be additionally split into a subsection 167 for display of local current and/or 3 or 5-day weather forecasts. The electronic display 146, 146', 146" may include media such as a client's name or trademark, etc. as illustrated at 162, which may be permanently affixed thereto.

Figure 3:
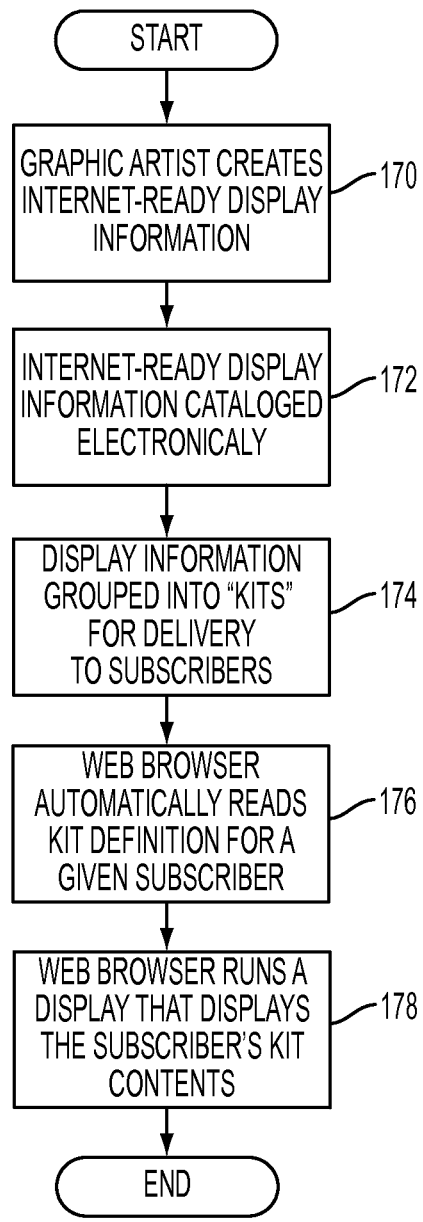
FIG. 3 is a partial flow diagram for a method of distributing electronic media according to the systems of FIG. 2.
Figure 4:
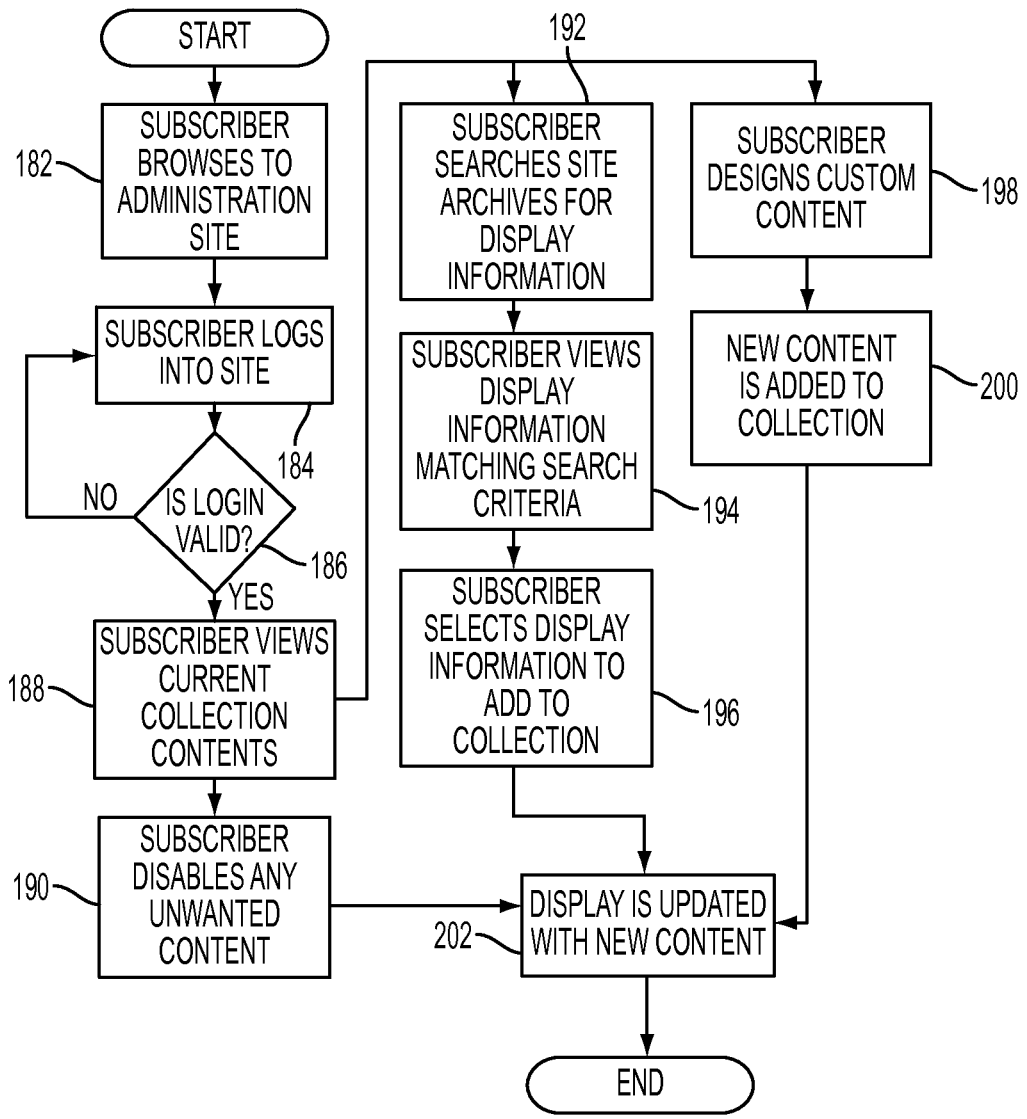
FIG. 4 is a partial flow diagram for a method of distributing electronic media according to the systems of FIGS. 1 and 2.

With reference to FIGS. 2-4, a graphic artist using work station 137 creates an employee communication, also referred to as "media content," in electronic form that is compiled into an employee communications collection in a data format, as discussed above, that is suitable for transmission over the Internet as shown at 170 (FIG. 3). The electronic employee communications are cataloged and stored in the data base server 135 at 172 (FIG. 3). As will be described further herein, in an embodiment, the data base server 135 may also receive subscriber- and/or employee-generated communications.

The application server 136 and workstation 137 function to group electronic employee communications by topic and edition. The electronic employee communications may also be compiled into employee communications collections arranged by, for example, a particular subscriber or subscriber type such as retail or manufacturing subscribers at 174 (FIG. 3.) For example, the subscribers of systems 140 and 140' may have access only to one set of electronic media collections while the subscriber of system 140" has access only to a different set of electronic media collections. The application server 136 is also configured to indicate the last time and date in which revisions or updates have been made to the employee communication collections.

Each subscriber may modify these collections using a subscriber workstation 142, 142', 142". The subscriber may select specific electronic employee communications (electronic media content) for display on the electronic display 146, 146', 146". Thereafter, the client server 144, 144', 144" communicates the electronic employee communications to the electronic display 146, 146', 146" at 176 (FIG. 3), as described above, for display at 178 (FIG. 3). The subscriber can query through the web browser to determine the latest times and dates of electronic media collection changes.

The subscriber may also modify the contents of an employee communication collection as follows. Using a subscriber workstation 142, 142', 142", the subscriber contacts the web server 133 (see, 182 and 184 of FIG. 4) and logs onto the web server 133. After checking for proper password and client ID at 186, the subscriber is allowed to view the current employee communication collection contents at 188. The subscriber may then choose between different options. The subscriber may search for electronic employee communications by topic, for example, electronic media content with themes such as safety, attitude, cooperation, etc. The subscriber may further remove any unwanted visual electronic media content or other content at 190. The subscriber may also search, using the application server 136, to select particular electronic media content or display information and add the selected media content to the employee communications collection at 192, 194 and 196. The subscriber may have access to various screens such as screen 250 (FIG. 6) to facilitate the search and selection. Optionally, the subscriber may design its own electronic media content within the application or simply provide electronic material for display, all of which may be added to the employee communications collection at 198 and 200. Once a subscriber has completed the modification, the application server 136 makes the updated employee communications collection available. Accordingly, when the client server 144, 144', 144" polls the web server 133, new media data is downloaded for display on the electronic display 146, 146', 146" as shown at 202 (FIG. 4.)

As indicated above, an employee (also referred to as "end user") of the subscriber may select, generate, and post media content for distribution to display devices and/or other employee devices (e.g., a computer, tablet PC, smart phone, etc., collectively referred to herein as "end user computers"). Permissions-based interaction among employees may also be implemented.

Turning now to FIGS. 6-10, end user-initiated communications provided by the electronic media communication system of FIGS. 1 and 2 will now be described by way of non-limiting embodiments. An administrator or other authorized individual associated with the subscriber (e.g., the service provider computer 118) may establish permissions that enable one or more end users or employees to submit and post content. In one embodiment, the administrator may configure these permissions via the user interface screen shown in FIG. 6. For example, the administrator may select one or more of the frames A, B or the News and Weather frame or the Ticker frame to be a designated communication channel in which certain employees may submit content.

Figure 6:
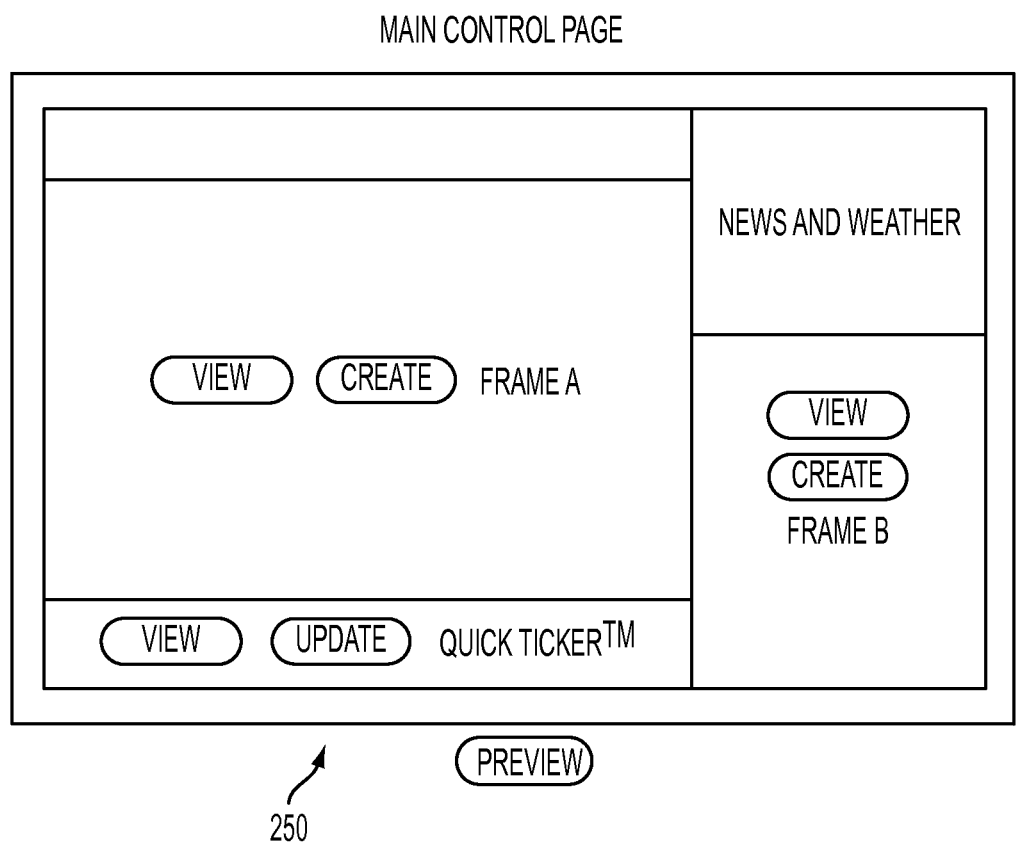
FIG. 6 is a representative screen generated by application software, which a subscriber may use in connection with the system of FIGS. 1 and 2.

For purposes of illustration, assume that the administrator has selected the Ticker frame of FIG. 6. The administrator may select the Update option in the Ticker frame, which may be used to not only add or modify content, but may also be used to grant permissions to end users or employees to submit content. Once the administrator selects the Update option, another user interface screen may be presented to the administrator for specifying permissions. For example, in one embodiment, the administrator may be presented with an option to select particular employees (e.g., by name or other identifier) who are granted permission to share content, an option to select groups of employees (e.g., based on a site location or department or job title), or other means of selection. A database of employee information may be used to match the information related to the sources of content submission (e.g., phone number of an employee's smart phone or email address) against information that is stored for these authorized employees. If the sources of the content submitted are successfully matched with the database of authorized employees, then the submitted content may be approved for publication. It is understood that greater or lesser scrutiny may be applied in determining whether to publish content submitted by an end user or employee. For example, in one embodiment, an administrator may configure the permissions to require that another level of review is employed once the source of the submission has been successfully authenticated. In this embodiment, the administrator may review, e.g., the content itself subject to the publication before allowing the content to be posted. As a further level of scrutiny, the administrator may set permissions to require that the content submitted by particular, identified employees be reviewed by the administrator or other individual prior to publication.

In addition, the user interface presented to the administrator may enable the administrator to select particular display devices, end user computers, or other destinations that may receive the content submitted by an end user. A database of authorized destination addresses, phone numbers, or other identifiers may be used to compare against a submitted content item in determining which destinations will be allowed to receive the posted content. In this manner, the administrator may control sending side submissions as well as receiving side (e.g., display device locations, end user computers, etc.) postings.

Figure 7:
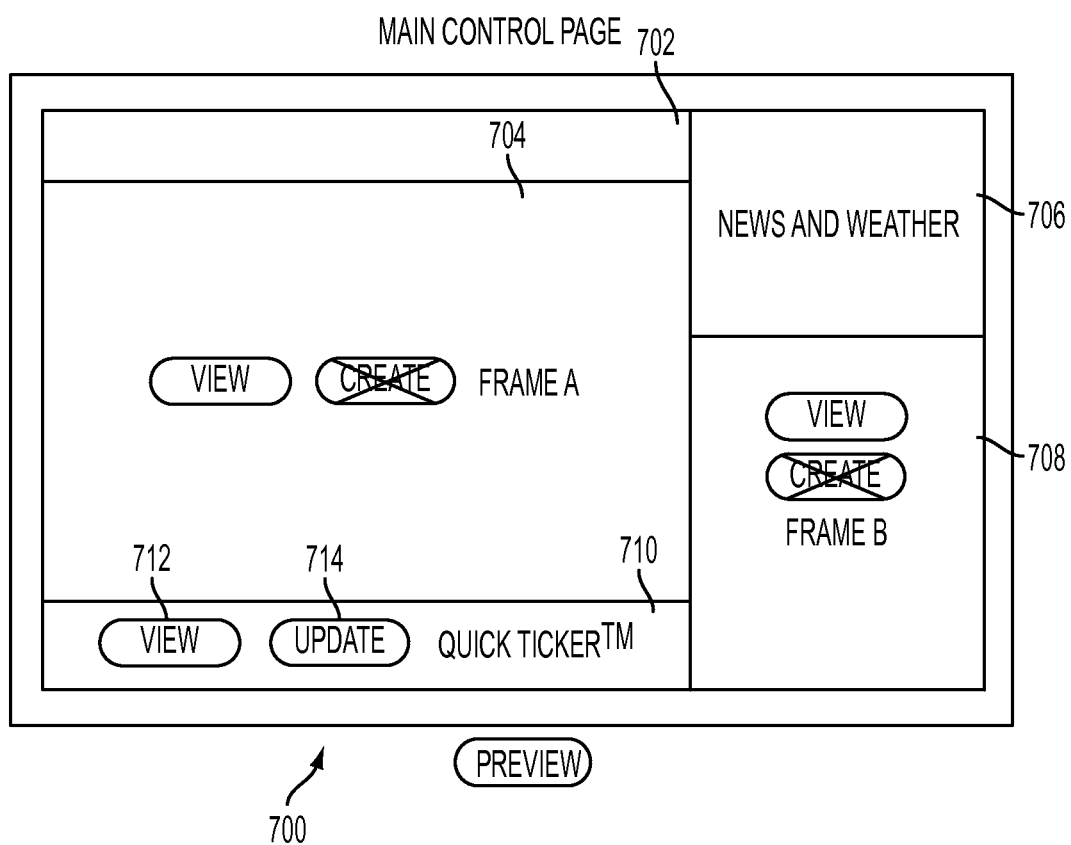
FIG. 7 is a representative screen generated by application software, which a subscriber or employee may use in connection with the system of FIGS. 1 and 2.
Figure 8:
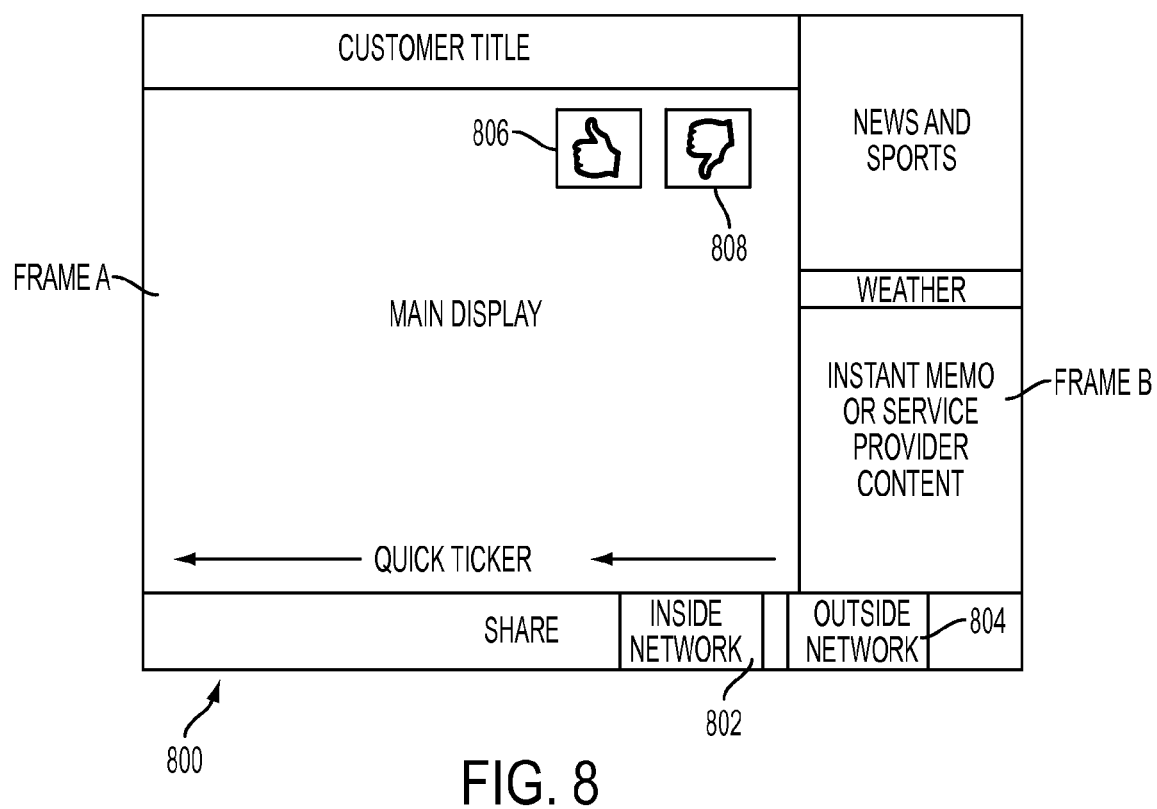
FIG. 8 is an annotated diagram of a representative electronic display or user interface according to FIGS. 1 and 2.

Once these permissions have been established, the end user who is granted these permissions may initiate a submission of a content item for publication over the network. The end user may access this feature, e.g., through a web browser on the end user computer 122. As shown in FIG. 7, by way of non-limiting example, user interface screen 700 is presented and may be similar in format as the user interface screen of the administrator (e.g., FIG. 6) except that it shows non-editable frames 702, 704, 706, and 708 (which frames correspond to communication channels), and are restricted for use by the administrator only (or alternatively, by the service provider computer 118 of FIG. 1). An editable frame 710, in this illustration, which also corresponds to a communication channel) provides a ticker which can be viewed and updated by respective selections 712 and 714. If the employee selects 714, the software provides an editable function in which the user may enter a desired media content item, which may or may not be immediately available for display. For example, in one embodiment, the media content input by the employee may be transmitted to the administrator of the subscriber for approval before it is added to the existing content for presentation in frame 710. Alternatively, the media content input by the employee may be placed in a queue (e.g., transmitted to the service provider over the network connection 116 (FIG. 1) and stored with the associated media content by the service provider) or may be stored locally, e.g., on the customer computer (e.g., 110 in FIG. 1), in the customer storage (e.g., 112 in FIG. 1) or in memory of the client workstation (e.g., 142 (FIG. 2). While the above employee-provided media content is described as directed for presentation via a designated frame on the display, it will be understood that the software may be configured such that the employee-provided media content may be distributed in any frame or a specially designated frame that displays only employee-provided content. In addition, the software may be configured such that the employee-provided media content may be targeted for display on selected displays (e.g., to a particular one or more employee devices and/or to a particular one or more display devices at a subscriber location associated with the employee or even to another subscriber location or end user device of an employee of that other subscriber location, based on permissions and/or review and approval by the other subscriber location and/or service provider. These features are described further herein.

As indicated above, the particular distribution of the employee-provided media content may be restricted based on permissions. The permissions may utilize criteria such as content type, content destination, and content originator, to name a few. For example, an employee responsible for managing various company metrics may be permitted to post related data to locations/devices relevant to the data (e.g., a photograph taken of a customer location may be posted to locations/devices with no restrictions).

Posting or sharing content provided by an employee may be implemented on two or more different levels. For example, one level of sharing may relate directly to other employees of the customer or subscriber, while another level may be expanded to include individuals or entities outside of the customer or subscriber network (e.g., a commercial social media web site). These levels of sharing are illustrated and executed via options 802 and 804 shown in FIG. 8. It will be understood that sharing certain data outside of the customer enterprise may be restricted or monitored by the subscriber or administrator if desired.

In one embodiment, media content that is posted by an employee may be rated in some fashion by other employees who receive the media content. For example, in one embodiment, a rating system "thumb up" 806 and "thumb down" 808 may be implemented by the software through the user interface screen 800 of FIG. 8. In other embodiments, any type of indicators may be used, such as smiley faces or a sequence of stars (e.g., 1-5 stars). The votes or ratings may be aggregated by the software and made available to various individuals (e.g., an administrator and/or originator of the media content).

The software may be further configured to enable employees to message other employees including those higher up in the chain of command. In one embodiment, the software may be configured to enable an employee to message at a set number of levels higher in the chain of command. For example, if the employee is at a first or lowest level, and the software is configured to permit the employee to message at two levels, the employee is able to message his boss, as well as the boss of the employee's boss. The software may provide a designation, e.g., via the interface screen of FIG. 6, that enables these features to an administrator (not shown).

Figure 9:
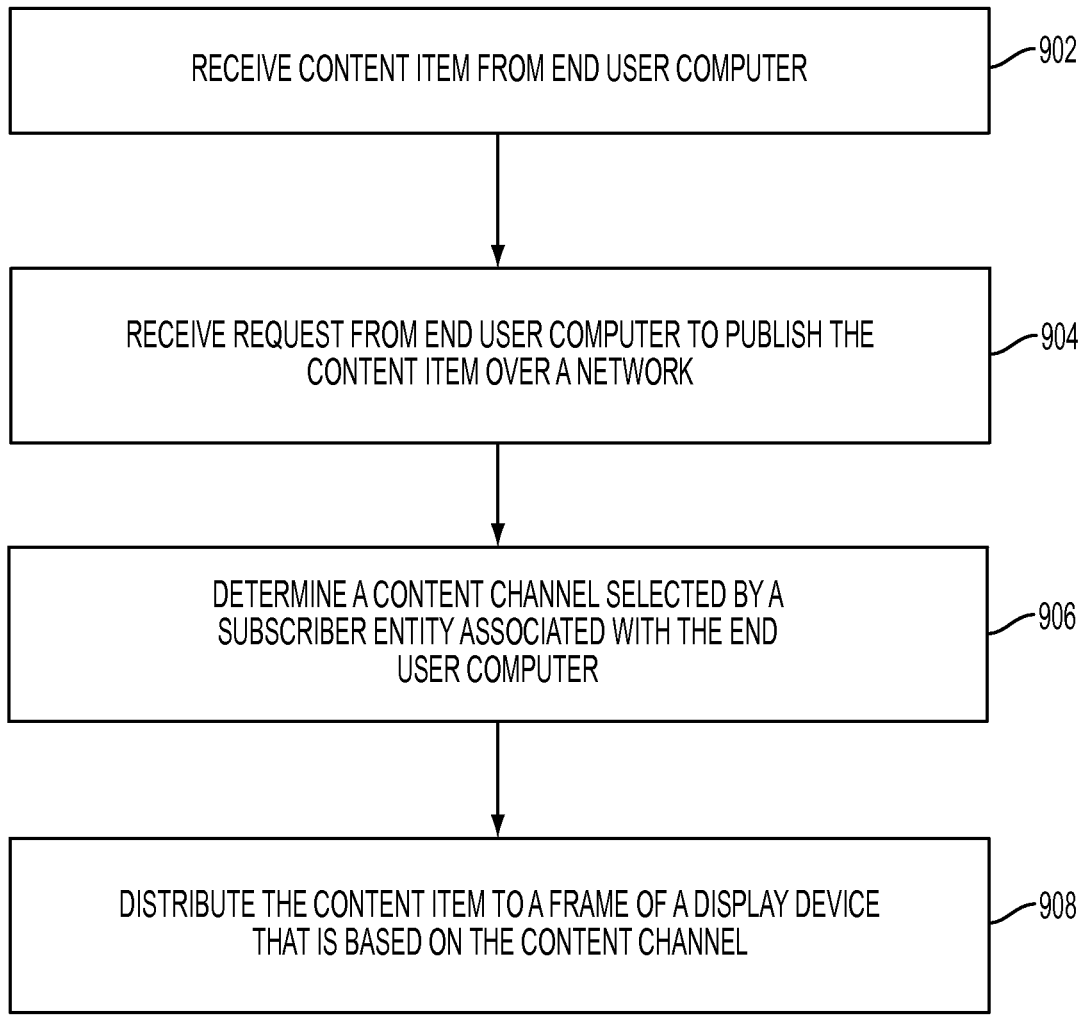
FIG. 9 is a partial flow diagram for a method of distributing electronic media according to some embodiments.

Turning now to FIG. 9, a flow diagram illustrating a process for enabling content submission and distribution will now be described in an embodiment. While the processes of FIG. 9 reflect employee-submitted content, it will be understood that the content may be alternatively, or in addition thereto, submitted by the employer, or subscriber, (e.g., an administrator or manager) in order to realize the exemplary embodiments. At block 902, the subscriber receives the media content item submitted by the end user computer. In addition, the subscriber receives a request from the end user computer to publish the media content item over a network at block 904.

At block 906, a content channel designated by the subscriber is determined. At block 908, the media content item is distributed to one or more display devices (within a frame based on the content channel) and/or end user computers for presentation. In an embodiment, the content item may be placed in a queue with other media content waiting to be published. For example, the media content item may be stored by the customer, along with other media content that is selected for presenting on one or more display devices.

In an alternative embodiment, once the subscriber initially receives the content item, the subscriber may send the content item to the service provider computer 118 for processing. In this embodiment, the service provider computer may store (e.g., in storage 120) the content item along with other media content designated for one or more of the display devices.

The software may also be configured to enable an employee to personalize his/her own user interface. In an embodiment, the software may include features that enable the user to customize the look of the interface presented on the end user device. In one embodiment, the software may enable the end user to post information on a 'wall' of their homespace. These items may be displayed as icons that are presented in a list format on the side of the screen or may be a separate page layout that is invoked by special command, keystroke or gesture. Items to be posted may include photos, notes, and/or items of personal interest of the end user. As described above, at least a portion of the layout and functionality of the interface displayed on the end user device may be configured by the subscriber. For example, the administrator may format the user interface to display a company logo in one area of the screen and, as indicated above, the administrator may designate one or more frames for customer content, while designating another frame for employee-generated content.

In addition, the content frames may be configured to provide categorized types of information. For example, in one embodiment, a first frame may be a chat frame that enables employees to communicate with their employer as well as among peers. An administrative control may be applied such that the administrator groups users by region or function (e.g., sales), and then the word Sales may appear in the chat frame. This frame may also be disabled if desired.

Another frame may be designated for events in which the administrator identifies office schedules, blood drives, holiday parties, server maintenance, etc. Touching the event by an end user opens a window with additional details. The user may click a button allowing other end users to comment on the event. The comment field may include a check box labeled "make anonymous." The comment may be routed to the original content creator (not the administrator, unless the administrator happens to be the creator). There may also be a "remind me" button that when clicked, will set an event reminder for the user. The user may set up a reminder schedule (e.g., 1 hour before the event). A third button may be used to "add to calendar" which adds the event to the user's calendar. Administrative control of the events frame may include adding a new frame, e.g., by going to an event layout function and selecting the type of event, with text, data, place and graphic fields. 'Text' may open a text field and keyboard, 'date' may open a calendar with a small text field, and 'place' may open multiple text fields: a first text field may be for the event name, a second text field may be for a description (optional), and a third text field may be for an address. The graphic field may hold a photo or illustration. The administrator may be given the option to show this content on a display device (e.g., display device 106 and/or an end user device (e.g., end user computer 122).

Yet another frame (or multiple frames) may be configured for presenting company content of the subscriber. These frames may display links to data that the administrator has added. The administrator may add additional frames as desired. Each frame may have content that links to similar content that is playing on the company's designated display devices, but may be a link as opposed to showing the actual content. When the end user touches a link, it may expand into a larger window and play the content. The end user may then go to full frame or click an option to dismiss it. The software may also be configured to enable the end user to select an option that will allow the end user to comment on the event via a comment field. The comment field may include a check box labeled, "make anonymous." The comment may be routed to the original content creator (not the administrator). The software may also be configured to provide a share option that allows the end user to send the content to someone else via email, text, or social media options provided by the software.

Figure 10:
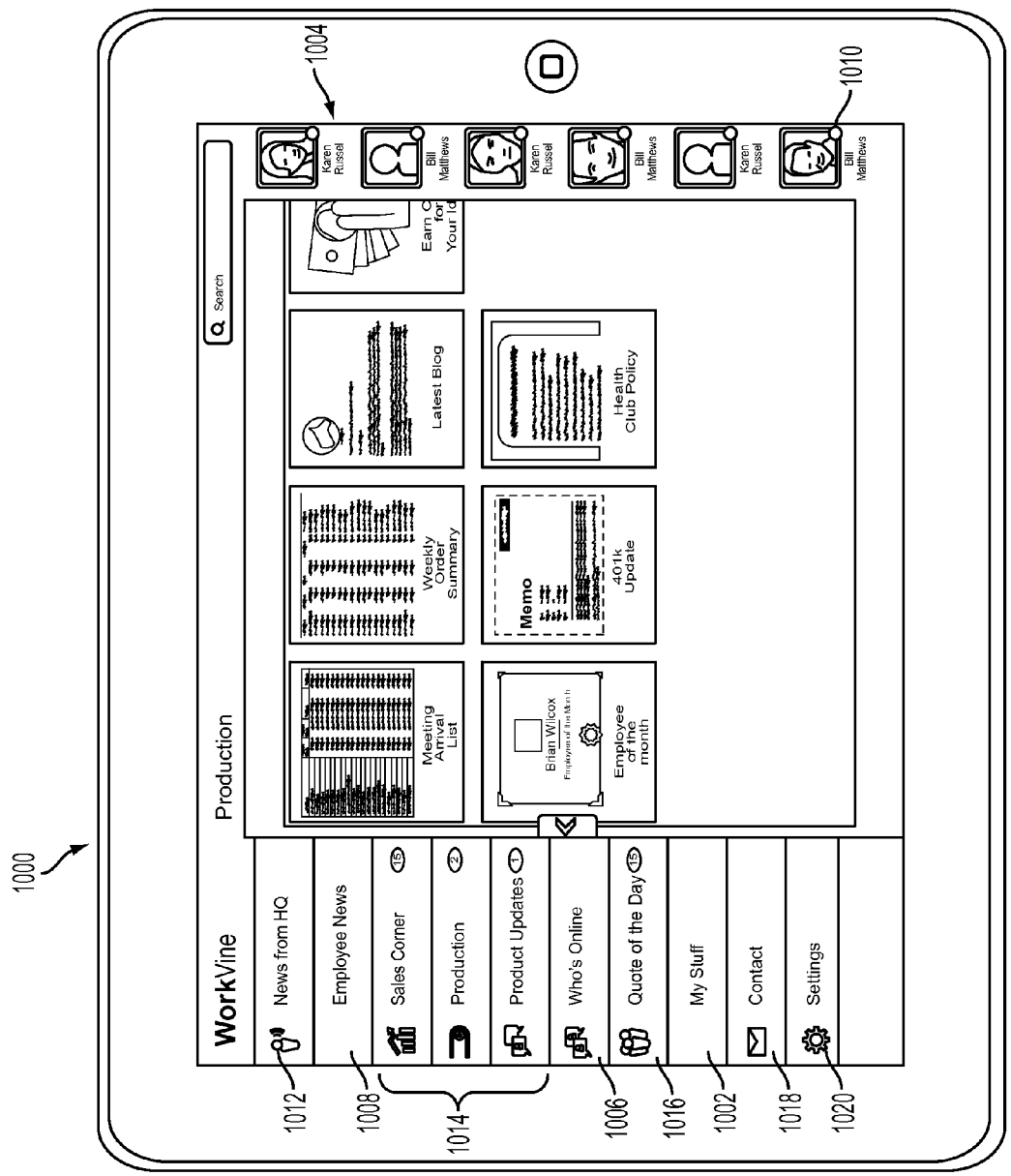
FIG. 10 is a diagram of a representative user interface according to FIGS. 1 and 2.

Turning now to FIG. 10, a diagram of a user interface screen 1000 according to another embodiment is shown. The user interface screen 1000 enables end users to customize the content generated by the service provider, the subscriber or employer, as well as by employees.

Various selectable options are shown listed vertically along the left margin of the user interface screen 1000. In one embodiment, the end user may view personal content through "My Stuff" 1002, which when selected, displays content specific to, or of otherwise interest to, the end user.

Along the right margin of the user interface screen 1000, a listing of contacts 1004 of the end user with corresponding names and images are provided. The listing 1004 may be retrieved, e.g., when the user selects "Who's Online" 1006 on the left side of the screen 1000. In addition, an identifier or indicator may be displayed with each of the contacts, as generally shown at 1010. The indicator 1010 may be color coded or otherwise differentiated to signify group membership. A group is an administrator- or user-defined collection of people that may be used, for example, to communicate with fellow employees who are working on a particular project or have some other defined commonality.

Other options on the left margin of the screen 1000 include "News from HQ" 1012, "Employee News" 1008, various departments of the employer, shown generally at 1014 and include "Sales Corner," "Production," and "Product Updates." In addition, the options may include "Quote of the Day" 1016, "Contact" 1018, and "Settings" 1020.

As shown by way of example in FIG. 10, the end user has selected "Employee News" 1008, which causes the software to retrieve frames of content as shown in FIG. 10. Illustrated in FIG. 10 are seven frames of content, each of which reflects employer-submitted content. It will be understood that, subject to permissions, there may be employee-generated content shown in at least one frame of the user interface screen 1000.

As indicated above, the software may be configured to enable the end user to customize the look of the user interface that will be viewed by the end user. The end user may initiate this function, e.g., by selecting the "Settings" option 1020.

The above-described embodiments can be in the form of computer-implemented processes and apparatuses for practicing those processes. The embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the present invention has been described in connection with what are presently considered to be the most practical and preferred embodiments, it is to be understood that the present invention is not limited to the disclosed embodiments. Rather it is intended to cover all of the various modifications and equivalent arrangements including within the spirit and scope of the appended claims.

What is claimed is:

1. A method for transmitting and displaying electronic media, comprising:
   receiving an electronic media collection comprising pre-assembled media content generated by a service provider computer, modified pre-assembled media content generated by a subscriber entity, and custom generated media content from end user computers associated with the subscriber entity;
   receiving a media content item, as the custom generated media content, from one of the end user computers;
   receiving a request from the end user computer to publish the media content item over a network;
   determining a content channel selected by the subscriber entity associated with the end user computer;
   determining a frame associated with the content channel, the frame comprising one of multiple frames, the multiple frames configured to display the pre-assembled media content and the modified pre-assembled media content;
   integrating the media content item with the pre-assembled media content and the modified pre-assembled media content; and
   distributing the media content item, the pre-assembled media content, and the modified pre-assembled media content to at least one other end user computer of the end user computers for presentation on a display device, the media content item displayed within the frame based on the content channel.

2. The method of claim 1, further comprising:
   verifying authorization of an end user of the end user computer that submitted the request before distributing the media content item.

3. The method of claim 2, further comprising:
   comparing an identification of the end user that submitted the request with a database of end users authorized to submit media content items;
   wherein the verifying authorization of the end user is successful when results of the comparing indicate a match.

4. The method of claim 1, further comprising:
   verifying authorization of an end user of the at least one other end user computer with respect to a destination location of the media content item;

wherein the distributing the media content item to at the least one other end user computer is implemented in response to a successful verification.

5. The method of claim 1, wherein:
the receiving the pre-assembled media content includes receiving the pre-assembled media content from a database of available pre-assembled media content offered by the service provider computer; and
the receiving the modified pre-assembled media content includes receiving a modified version of the pre-assembled media content from the subscriber entity.

6. The method of claim 1, further comprising:
integrating the media content item with other media content items that are submitted by other end user computers such that the media content item is displayed, within the frame, in sequence with the media content items submitted by the other end user computers.

7. A system for transmitting and displaying electronic media, comprising:
a controller having a computer processor, the controller configured to:
receive an electronic media collection comprising pre-assembled media content generated by a service provider computer, modified pre-assembled media content generated by a subscriber entity operating the controller, and custom generated media content from end user computers associated with the subscriber entity;
receive a media content item, as the custom generated media content, from one of the end user computers;
receive a request from the end user computer to publish the media content item over a network;
determine a content channel selected by the subscriber entity associated with the end user computer;
determine a frame associated with the content channel, the frame comprising one of multiple frames, the multiple frames configured to display the pre-assembled media content and the modified pre-assembled media content;
integrate the media content item with the pre-assembled media content and the modified pre-assembled media content; and
distribute the media content item, the pre-assembled media content, and the modified pre-assembled media content to at least one other end user computer of the end user computers for presentation on a display device, the media content item displayed within the frame based on the content channel.

8. The system of claim 7, wherein the controller is further configured to:
verify authorization of an end user of the end user computer that submitted the request before distributing the media content item.

9. The system of claim 8, wherein the controller is further configured to:
compare an identification of the end user that submitted the request with a database of end users authorized to submit media content items;
wherein verifying authorization of the end user is successful when results of the comparing indicate a match.

10. The system of claim 7, wherein the controller is further configured to:
verify authorization of an end user of the at least one other end user computer with respect to a destination location of the media content item;
wherein distributing the media content item to the at least one other end user computer is implemented in response to a successful verification.

11. The system of claim 7, wherein:
the receiving the pre-assembled media content includes receiving the pre-assembled media content from a database of available pre-assembled media content offered by the service provider computer; and
the receiving the modified pre-assembled media content includes receiving a modified version of the pre-assembled media content from the subscriber entity.

12. The system of claim 7, wherein the controller is further configured to:
integrate the media content item with other media content items that are submitted by other end user computers such that the media content item is displayed, within the frame, in sequence with the media content items submitted by the other end user computers.

13. A computer program product for transmitting and displaying electronic media, the computer program product comprising a storage medium having computer program instructions embedded therein, which when executed by a computer processor, causes the computer processor to:
receive an electronic media collection comprising pre-assembled media content generated by a service provider computer, modified pre-assembled media content generated by a subscriber entity, and custom generated media content from end user computers associated with the subscriber entity;
receive a media content item, as the custom generated media content, from one of the end user computers;
receive a request from the end user computer to publish the media content item over a network;
determine a content channel selected by the subscriber entity associated with the end user computer;
determine a frame associated with the content channel, the frame comprising one of multiple frames, the multiple frames configured to display the pre-assembled media content and the modified pre-assembled media content;
integrate the media content item with the pre-assembled media content and the modified pre-assembled media content; and
distribute the media content item, the pre-assembled media content, and the modified pre-assembled media content to at least one other end user computer of the end user computers for presentation on a display device, the media content item displayed within the frame based on the content channel.

14. The computer program product of claim 13, wherein the program instructions are further configured to:
verify authorization of an end user of the end user computer that submitted the request before distributing the media content item.

15. The computer program product of claim 14, wherein the program instructions are further configured to:
compare an identification of the end user that submitted the request with a database of end users authorized to submit media content items;
wherein verifying authorization of the end user is successful when results of the comparing indicate a match.

16. The computer program product of claim 13, wherein the program instructions are further configured to:
verify authorization of an end user of the at least one other end user computer with respect to a destination location of the media content item;
wherein distributing the media content item to the at least one other end user computer is implemented in response to a successful verification.

17. The computer program product of claim 13, wherein:
- receiving the pre-assembled media content includes receiving the pre-assembled media content from a database of available pre-assembled media content offered by the service provider computer; and
- receiving the modified pre-assembled media content includes receiving a modified version of the pre-assembled media content from the subscriber entity.

18. The computer program product of claim 13, wherein the program instructions are further configured to:
- integrate the media content item with other media content items that are submitted by other end user computers such that the media content item is displayed, within the frame, in sequence with the media content items submitted by the other end user computers.

* * * * *